Patented June 23, 1953

2,643,270

UNITED STATES PATENT OFFICE 2,643,270

HALOGENATED COMPOUNDS

Sidney D. Ross, Williamstown, Mass., assignor to Sprague Electric Company, North Adams, Mass., a corporation of Massachusetts No Drawing. Application August 7, 1951,
Serial No. 240,799

6 Claims. (Cl. 260—611)

This invention relates to a new and improved group of substituted pentachlorostyrene compounds. More particularly it refers to beta substituted pentachlorostyrene derivatives.

It is an object of this invention to produce pentachlorostyrene derivatives which may be copolymerized with other compounds. Another object of the invention is to produce new and useful pentachlorostyrene derivatives which may be employed as chemical intermediates. These and other objects will be apparent from consideration of the following description and claims.

The compounds of my invention conform to the general formula:

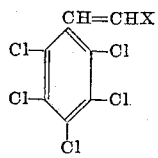

in which X represents either a halogen atom or an alkoxy group.

Some preferred compounds of the invention which conform to the formula are:

Omega chloro pentachlorostyrene
Omega bromo pentachlorostyrene
Omega ethoxy pentachlorostyrene
Omega methoxy pentachlorostyrene
Omega propoxy pentachlorostyrene My new compounds can be conveniently prepared, in the case of the halo substituted types, by reacting either an alpha, beta-dihalogen substituted ethyl pentachlorobenzene with methanol and potassium carbonate in order to create a double bond on the ethyl group, or in the case of the alkoxy types, by refluxing omega halogen substituted pentachlorostyrene with an alkali metal alkoxide and an alcohol.

The dihalogen ethyl pentachlorobenzenes which may be used as a starting point with this invention may be conveniently prepared in accordance with any of the manners set forth in copending application, Serial No. 242,977 filed August 21, 1951. The alcohols which may be conveniently attached beta to the benzene ring in pentachlorostyrene are preferably the aliphatic ones, such as methanol, ethanol, butanol, propanol, amyl alcohol, and the like. Mercaptans, primary and secondary amines, metal derivatives of active hydrogen compounds, and other compounds can also be attached beta to this nucleus.

The following examples are given for purposes of illustration only, and are not to be considered as limiting the invention in any manner.

EXAMPLE I

*Preparation of omega chloro pentachlorostyrene*

39.2 gms. of alpha-bromo, beta-chloro ethyl pentachlorobenzene was refluxed overnight with 13.8 gms. of potassium carbonate and 500 cc. of methanol. The reaction mixture was poured into water, and the precipitate crystallized from acetic acid, giving 28.5 gms. of product. The melting point was 115–116° C. after crystallization from acetic acid. The calculated analysis of this product was 30.91% carbon, 0.65% hydrogen. The actual analysis indicated 30.91%, 30.86% carbon and 0.66% and 0.61% hydrogen.

EXAMPLE II

*Preparation of omega bromo pentachlorostyrene*

4.4 gms. of alpha, beta-dibromo ethyl pentachlorobenzene were refluxed 24 hrs. with 1.4 gms. potassium carbonate and 50 cc. of methanol. The mix was poured into water and the precipitate crystallized from acetic acid. The product was recrystallized from acetic acid-methanol (3:1), to give a product having a melting point of 111–114° C. The theoretical analysis of this product was 27.03% carbon, and 0.57% hydrogen. The actual analysis found was 26.77, 26.69% carbon and 0.72%, 0.64% hydrogen.

EXAMPLE III

*Preparation of omega ethoxy pentachlorostyrene*

3.43 gms. of omega chloro pentachlorostyrene obtained as in Example I was refluxed 6 hrs. with 1.1 gms. of potassium hydroxide and 150 cc. of absolute alcohol. At the end of 6 hrs. of refluxing the mixture was poured into water, and the precipitated product crystallized from methanol. Both the cis and trans forms of this product were obtained. 0.5 gm. of one of these forms having a melting point of 106.5–107° C. was recovered by mere mechanical separation of the crystals. The calculated analysis on this product was 37.50% carbon and 2.20% hydrogen. On actual analysis it was found to have 37.00, 37.28% carbon, 2.06%, 2.26% hydrogen. An additional .5 of a gram of different crystals having a melting point from 73 to 75° C. was recovered by mechanical separation. These were analysed to give 37.19, 37.00% carbon and 2.23, 2.08% hydrogen. As will be seen from the following example, the same two products, that is the cis and trans forms of omega ethoxy pentachlorostyrene, were also obtained by other methods.

EXAMPLE IV

*Preparation of omega ethoxy pentachlorostyrene*

In this case 8.8 gms. alpha, beta-dibromo ethyl pentachlorobenzene were refluxed for 5 hrs. with the reaction product of 1.4 gms. of sodium in 350 cc. of ethyl alcohol (absolute). At the end of this period the alcohol was distilled off, and the reaction product poured into water. The precipitate was filtered and purified by crystallization from methanol. The crystallized product had a melting point of 105–107° C. The mother liquor gave a product melting at 63–73° C. The calculated analysis of the first compound was 37.94% carbon and 2.20% hydrogen. The analysis found was 37.00, 37.21% carbon and 2.39, 2.49% hydrogen. The second product, representing a mixture of cis- and trans-isomers and having a melting point of from 63 to 73° C., gave on analysis 37.19, 36.92% carbon and 2.15, 2.32% hydrogen. The compounds are cis- and trans-forms of the omega-ethoxy pentachlorostyrene.

EXAMPLE V

*Preparation of omega methoxy pentachlorostyrene*

17.6 g. of alpha, beta-dibromo ethyl pentachlorobenzene was added to a reaction product of 700 cc. methanol and 2.8 g. of sodium, after which the solution was refluxed for 5 hours. At the end of this time, the alcohol was partially distilled off and the mixture was poured into water. The precipitate was filtered, yielding 12 g. of a crude product having a melting point of 93–123° C. This product was then crystallized from methanol containing a little benzene. Four crops of crystals were obtained. The first consisted of 5.8 g. of crystals melting at 130–134° C. Upon repeated (3 times) recrystallization from methanol and benzene (2:1), a product having a melting point 138–139° C. was obtained. The calculated analysis of this product was carbon 35.28%; hydrogen 1.64%; the found analysis was carbon 34.92, 34.68%; hydrogen 1.38, 1.44%.

Following the procedures given in either of the last two examples, it is possible to obtain ethers of any of the common lower alcohols. All of these ethers exist in the same cis and trans forms in which the omega ethoxy pentachlorostyrene exists.

The compounds of this invention are of utility in a wide variety of fields. They may be conveniently used to form copolymers with any other common polymerizable materials. They can be used as intermediates in the synthesis of various other organic compounds. The materials, particularly the alkoxy types, are useful as the dielectrics in various types of electrical equipment. They are also of utility in flame proofing various materials, and as plasticizers for resins.

The omega-alkoxy pentachlorostyrenes are also a suitable intermediate for the preparation of pentachlorophenylacetaldehyde. The latter can be obtained on ether cleavage of the omega-alkoxy pentachlorostyrene.

As many wide different embodiments of this invention may be made without parting from the spirit and scope thereof, it is to be understood that the invention is not limited to the specific embodiment set forth herein except as defined in the appended claims.

What is claimed is:

1. A compound conforming to the formula:

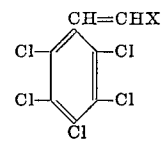

wherein X represents a substituent selected from the class containing halogen and alkoxy groups.

2. Omega-halo pentachlorostyrene.
3. Omega alkoxy pentachlorostyrene.
4. Omega chloro pentachlorostyrene.
5. Omega bromo pentachlorostyrene.
6. Omega ethoxy pentachlorostyrene.

SIDNEY D. ROSS.

References Cited in the file of this patent

UNITED STATES PATENTS

| Number | Name | Date |
|---|---|---|
| 2,193,823 | Levine | Mar. 19, 1940 |